UNITED STATES PATENT OFFICE.

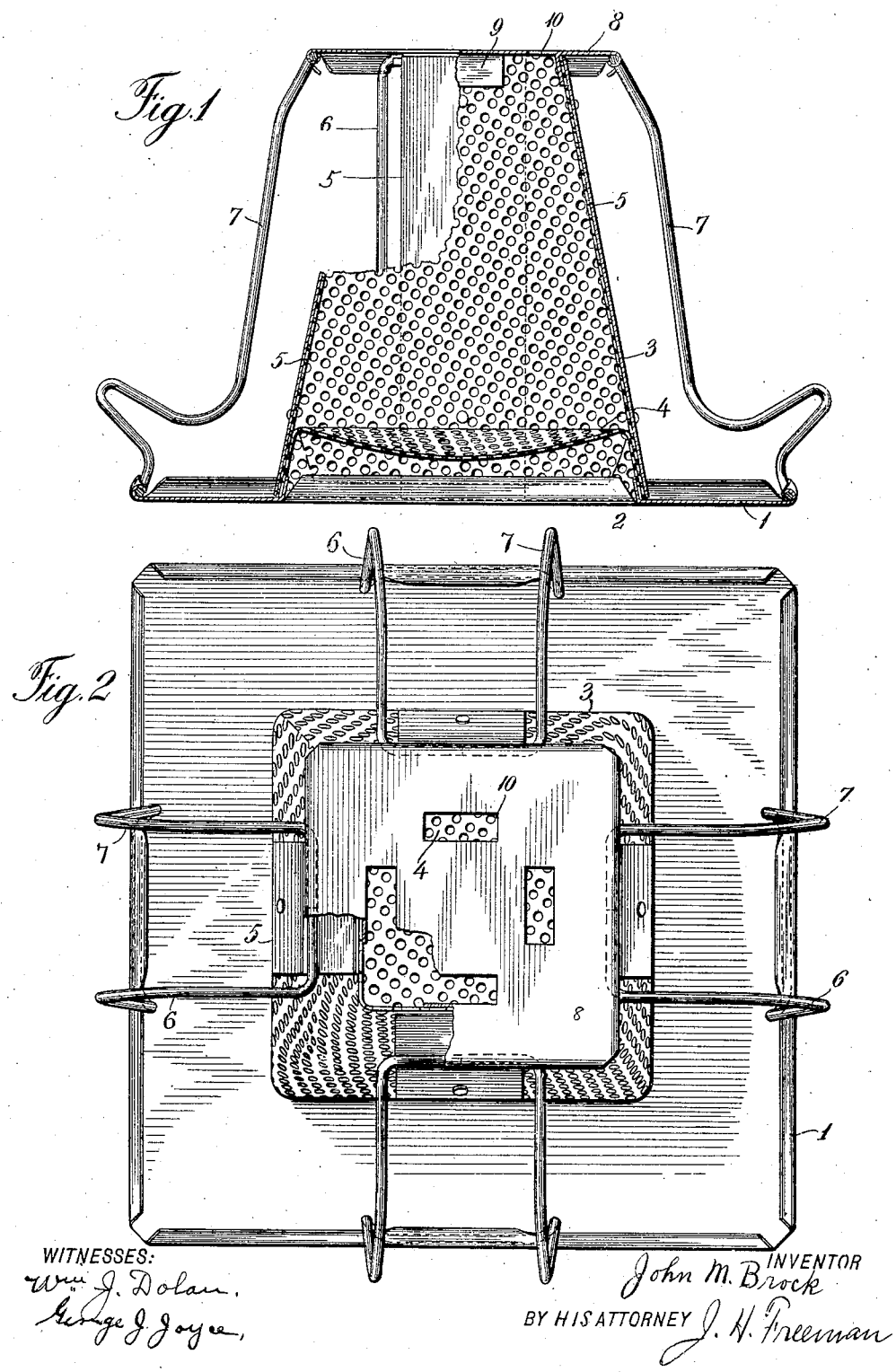

JOHN M. BROCK, OF NEW YORK, N. Y., ASSIGNOR TO WILLIAM M. CRANE COMPANY, A CORPORATION OF NEW YORK.

TOASTER.

No. 846,546.   Specification of Letters Patent.   Patented March 12, 1907.

Application filed August 7, 1905. Serial No. 272,996.

*To all whom it may concern:*

Be it known that I, JOHN M. BROCK, a citizen of the United States, and a resident of New York, county and State of New York, have invented certain new and useful Improvements in Toasters, of which the following is a specification.

My invention relates to cooking utensils, and while it may be embodied in constructions adapted for various purposes it is more particularly applicable to devices for toasting bread and similar material.

An object of the invention is to provide a construction whereby the material shall be uniformly and evenly subjected to the action of heat, also to provide a construction which although particularly adapted for use in connection with the flames of a gas or oil stove shall nevertheless subject the material to the heat of radiation, and also to provide a construction which at the same time shall be simple, cheap, and durable in construction. These and other objects of the invention will in part be obvious and in part made clear from the following description.

My invention consists in the novel parts, improvements, and features of construction herein shown and described.

The accompanying drawings, which are referred to herein and form a part hereof, illustrate one embodiment of the invention, the same serving in connection with the description herein to explain the principles thereof.

Of the drawings, Figure 1 is a vertical central section of a toaster constructed in accordance with the invention, and Fig. 2 is a plan view of the same.

A toaster constructed in accordance with certain features of my invention comprises a base having an opening therein, an upwardly-tapering hollow reticulated member, means for supporting the material to be toasted, means for deflecting a portion of the heated gases away from the vertical central portion of the material being toasted toward the vertical side portions of said material, and means so arranged with relation to the opening in the base as to distribute the heated gases passing through said opening.

In accordance with one feature of the invention the means for supporting the material to be toasted are located adjacent to but out of contact with the exterior surface of the upwardly-tapering hollow reticulated member, and the means for deflecting a portion of the heated gases away from the vertical central portion of the material being toasted toward the vertical side portions of said material are arranged adjacent to the exterior surface of the upwardly-tapering hollow reticulated member and opposite the vertical central portions of the material being toasted.

In accordance with another feature of the invention the means serving to distribute the heated gases passing through the base are so arranged with relation to the opening in the base as to become highly heated, and thereby subject the material to the heat of radiation.

These and other features of the invention will be more particularly set forth in the following description.

Referring now in detail to the particular embodiment of the invention illustrated in the drawings, the base portion 1 of the toaster may be of any suitable shape, as shown being rectangular. This base is provided with an opening 2, adapted to permit the passage of the heated gases therethrough, and while this opening may be of any desired form it is shown as being rectangular and located in the central portion of the base. Rising from the base is an upwardly-tapering hollow reticulated member 3, which acts to distribute the heated gases coming into its chamber. This upwardly-tapering heat-distributer may be of any suitable form. In the preferred form of the invention and as illustrated in the drawings it is in the form of the frustum of a pyramid.

Suitable means are provided for distributing the heated gases on entering the upwardly-tapering hollow reticulated member. In the embodiment of the invention illustrated in the drawings this means is represented as a central baffle-plate 4. In accordance with one feature of the invention this baffle-plate is substantially horizontal and arranged adjacent to the opening 2, so that it will become highly heated from the flame over which the device rests, thereby serving as a means for subjecting the material to be toasted to a heat of radiation. Preferably, and as shown, this baffle is in the form of a reticulated plate covering substantially the entire opening 2 and conforming in outline thereto.

An important feature of the invention consists in the means 5 for deflecting a portion of the heated gases from the vertical central portions of the material being toasted toward the vertical side portions thereof. These deflectors are preferably arranged in close relation with the outer surface of and may cover the upwardly-tapering heat-distributer to any desired extent and may be either reticulated or imperforate. In the construction shown in the drawings these deflectors are shown as imperforate and as being arranged one on each face of the pyramidal heat-distributer, opposite to and of a size or extent with relation to the said pyramidal heat-distributer adapted to deflect a portion of the heated gases away from the vertical central portion of the material being toasted.

Suitable means are provided for supporting the material to be toasted. In the embodiment of the invention illustrated there is used a plurality of wire supports, one support 6 7 being shown on each face of the pyramidal heat-distributer. While these supports may be fastened in any suitable manner, as shown, each support is connected at one end to the base and at the other end to a top member 8. Any suitable top member may be provided. According to one form of the invention a flat horizontal top member is fastened to the upwardly-tapering hollow reticulated member and preferably secured by depending integral lugs or wings 9, engaging with the inner surface of the tapering member 3, and is furnished, as indicated in the drawing, with suitable orifices 10 for the escape of the heated gases, said orifices preferably being made by depressing said lugs or wings.

The material to be toasted, as slices of bread, is placed in a substantially vertical position upon the supports 6 7 adjacent to the outer surfaces of the member 3, so that the vertical central portions of the material will be arranged opposite the vertical deflectors 5. As the vertical central portions of the material to be toasted are closer to the source of heat than the vertical side portions thereof, a part of the heated gases is prevented by the deflectors from coming directly into contact with the material. At the same time the said deflectors serve to direct the heated gases toward the outer vertical portions of the material, or those portions which are farthest from the source of heat. The deflectors being constructed in about the proportions shown in the drawings, the heat issuing from the device will be quite evenly distributed upon the slices of material to be toasted and so as to produce uniform results.

It will be seen that by reason of the construction shown and described a toaster is provided which is simple in construction, durable, and of great efficiency. Another advantage of my invention is that it provides a simple construction of such character that it may be formed almost entirely of stamped sheet metal.

It is to be understood that my invention in its broader aspects is not limited to the precise construction shown nor to any particular construction by which the invention has been or may be carried into effect, as many changes may be made in the details of the parts without departing from the main principles of the invention and without sacrificing its chief advantages.

What I claim is—

1. A toaster consisting of a base with an opening therein, an upwardly-tapering hollow reticulated member, means for supporting the material to be toasted in a substantially upright position adjacent to the outer surface of the reticulated member, and means for deflecting a portion of the heated gases away from the vertical central portion of the material being toasted and toward the vertical side portions of said material.

2. A toaster consisting of a base with an opening therein, an upwardly-tapering hollow reticulated member, means for supporting the material to be toasted in a substantially upright position adjacent to the outer surface of the reticulated member, means for deflecting a portion of the heated gases away from the vertical central portion of the material being toasted and toward the vertical side portions of said material, and means so arranged with relation to the opening in the base as to distribute the heated gases passing through said opening.

3. A toaster consisting of a base with an opening therein, an upwardly-tapering hollow reticulated member, means located adjacent to the exterior surface of said upwardly-tapering hollow reticulated member for supporting the material to be toasted in a substantially upright position, imperforate means arranged opposite the vertical central portions of the material being toasted and adapted to deflect a portion of the heated gases away from said central portions and toward the vertical side portions of said material, and means so arranged with relation to the opening in the base as to distribute the heated gases passing through said opening.

4. A toaster consisting of a base with an opening therein, a hollow reticulated heat-distributer in shape like the frustum of a pyramid, a plurality of supports each located adjacent to and substantially parallel with one of the outer surfaces of the pyramidal heat-distributer for supporting the material to be toasted, an imperforate deflector-plate arranged opposite each of the outer surfaces of the hollow reticulated heat-distributer, and a reticulated baffle-plate arranged with relation to the opening in the base so as to distribute the heated gases passing through said opening.

5. In a toaster, the combination of a base with an opening therein, an upwardly-tapering hollow reticulated member, means for supporting the material to be toasted in a substantially upright position adjacent to the outer surface of the reticulated member, means for deflecting a portion of the heated gases away from the vertical central portion of the material being toasted and toward the vertical side portions of said material, and a member arranged in substantially horizontal position adjacent to the opening in the base in such manner as to become highly heated and thereby to heat the toast by radiation.

6. A toaster consisting of a base with an opening therein, an upwardly-tapering hollow reticulated member, means for supporting the material to be toasted in a substantially upright position adjacent to the outer surface of the reticulated member, means for deflecting a portion of the heated gases away from the vertical central portion of the material being toasted and toward the vertical side portions of said material, means so arranged with relation to the opening in the base as to distribute the heated gases passing through said opening, and a top member, said supports being connected at one end to said top and at the other end to said base.

In testimony whereof I have signed my name to this specification in the presence of two subscribing witnesses.

JOHN M. BROCK.

Witnesses:
GEORGE VAUGHAN,
A. CARMER.